(12) United States Patent
Barberis

(10) Patent No.: US 12,024,370 B2
(45) Date of Patent: Jul. 2, 2024

(54) AUTOMATED SHIPPING PROCESSOR LINE AND METHOD FOR AUTOMATICALLY SHIPPING PACKAGES

(71) Applicant: BEL USA LLC, Medley, FL (US)

(72) Inventor: Alex Barberis, Medley, FL (US)

(73) Assignee: BEL USA, LLC, Medley, FL (US)

( * ) Notice: Subject to any disclaimer, the term of this patent is extended or adjusted under 35 U.S.C. 154(b) by 750 days.

(21) Appl. No.: 16/412,088

(22) Filed: May 14, 2019

(65) Prior Publication Data

US 2019/0352100 A1      Nov. 21, 2019

Related U.S. Application Data

(60) Provisional application No. 62/672,308, filed on May 16, 2018.

(51) Int. Cl.
*B65G 43/08* (2006.01)
*B65C 1/02* (2006.01)
(Continued)

(52) U.S. Cl.
CPC ............... *B65G 43/08* (2013.01); *B65C 1/02* (2013.01); *B65C 9/02* (2013.01); *B65G 43/10* (2013.01);
(Continued)

(58) Field of Classification Search
CPC ....... B65C 9/02; B65C 1/02; B65C 2009/408; B65G 43/08; B65G 43/10;
(Continued)

(56) References Cited

U.S. PATENT DOCUMENTS 3,436,968 A     4/1969 Unger et al.
4,944,135 A *   7/1990 Treiber .................. B65B 11/54
                                                                 198/572
(Continued)

FOREIGN PATENT DOCUMENTS

FR         2785382 A1    5/2000
KR    20140084496 A      7/2014

*Primary Examiner* — Thomas Randazzo
(74) *Attorney, Agent, or Firm* — Gregory L. Mayback; Mayback IP Law, P.A.

(57) ABSTRACT

An automated package processing system includes a conveyor, a package scale within a movement surface of the conveyor and outputting weight information for a package, a display, a shipping database containing shipping information comprising package recipients and package shippers, a printer within arms-reach of the scale and printing out labels containing a package recipient and a package shipper, at least one scanning device projecting a scanning field onto the scale weighing surface and outputting package measurement information indicating package volume characteristics, and a central processor communicatively connected to the scale, display, shipping database, printer, and scanning device. Each of the packages have package information and a respective package identifier. The central processor is programmed to determine automatically the package shipper and a total shipping cost based upon at least one of the package information and the shipping information independent of the weight of the package.

19 Claims, 3 Drawing Sheets

(51) Int. Cl.
  *B65C 9/02* (2006.01)
  *B65C 9/40* (2006.01)
  *B65G 43/10* (2006.01)
  *G06K 7/10* (2006.01)
  *G06K 7/14* (2006.01)
  *G06Q 10/083* (2024.01)
  *G06Q 10/0832* (2023.01)
  *G06Q 10/0834* (2023.01)

(52) U.S. Cl.
  CPC ....... *G06K 7/10861* (2013.01); *G06K 7/1413* (2013.01); *G06Q 10/083* (2013.01); *G06Q 10/0832* (2013.01); *G06Q 10/0834* (2013.01); *G06Q 10/08345* (2013.01); *B65C 2009/408* (2013.01)

(58) Field of Classification Search
  CPC .... B65G 2203/0208; B65G 2203/0258; B65G 2203/041; G06K 7/10861; G06K 7/1413; G06K 7/10435; G06Q 10/083; G06Q 10/0834; G06Q 10/08345; G06Q 10/0832
  See application file for complete search history.

(56) References Cited

U.S. PATENT DOCUMENTS

| | | | |
|---|---|---|---|
| 5,501,571 | A | 3/1996 | Durrett et al. |
| 5,834,706 | A | 11/1998 | Christ |
| 6,962,291 | B2 | 11/2005 | Guntveit et al. |
| 7,287,694 | B2 | 10/2007 | Banavar et al. |
| 7,321,859 | B2 | 1/2008 | Cooper et al. |
| 7,650,289 | B2 | 1/2010 | Cooper et al. |
| 8,489,232 | B2 | 7/2013 | Mishra et al. |
| 9,174,758 | B1 | 11/2015 | Rowley et al. |
| 2015/0106224 | A1* | 4/2015 | Stevens .............. G06Q 30/0631 705/26.7 |
| 2016/0368643 | A1 | 12/2016 | Serjeantson et al. |
| 2018/0018519 | A1* | 1/2018 | O'Brien ................ G06F 40/117 |
| 2018/0282075 | A1* | 10/2018 | Allen ............... G05B 19/41895 |
| 2018/0314999 | A1* | 11/2018 | Nemati ............... G06Q 10/087 |
| 2018/0374046 | A1* | 12/2018 | Powers ............ G06Q 10/08345 |
| 2019/0212956 | A1* | 7/2019 | Christman ................ B65C 1/00 |
| 2020/0189861 | A1* | 6/2020 | Kleczewski .............. B07C 5/18 |

* cited by examiner

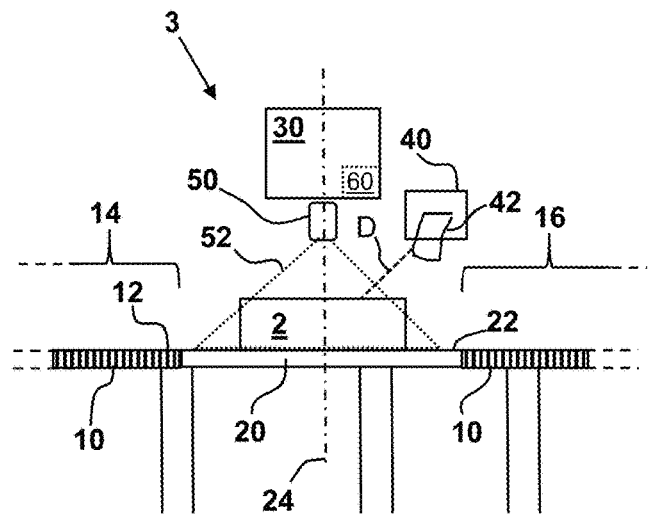
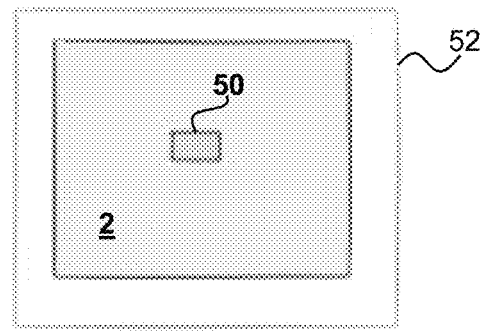
FIG. 1
FIG. 3
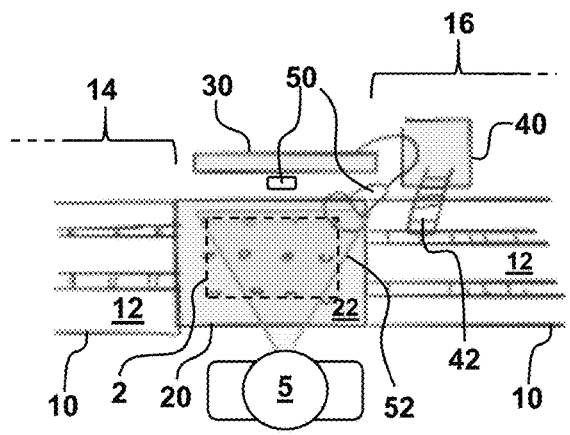
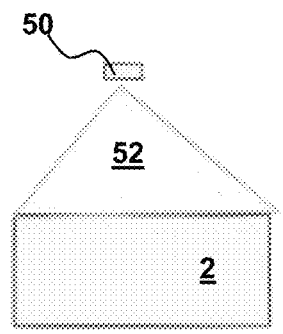
FIG. 2
FIG. 4

AUTOMATED SHIPPING PROCESSOR LINE AND METHOD FOR AUTOMATICALLY SHIPPING PACKAGES

CROSS-REFERENCE TO RELATED APPLICATIONS

This application claims the priority, under 35 U.S.C. § 119, of U.S. Provisional Patent Application No. 62/672,308, filed May 16, 2018; the prior application is herewith incorporated by reference herein in its entirety.

STATEMENT REGARDING FEDERALLY SPONSORED RESEARCH OR DEVELOPMENT

Not Applicable

FIELD OF THE INVENTION

The present systems, apparatuses, and methods lie in the field of shipping. The present disclosure relates to an automated shipping processor line and method for automatically shipping packages.

BACKGROUND OF THE INVENTION

In businesses where a large number of packages need to be shipped, two primary characteristics govern efficient processing. The first is speed. Processing a package includes identifying the weight of the package, determining the shipping destination, selecting the most efficient shipper to that destination for the weight, placing the shipping label for the selected shipper on the package, and, finally, moving the package to where the selected shipper can receive it as quickly as possible. The faster each of these determinations and actions can be made, the faster the package can be shipped, which means that speed of the processing line increases and costs associated with the movement through the processor line decrease. The second consideration is landscape or floor space. It is well known that costs of a processing line increase when more floor space is required for that line. Accordingly, it is desirable to reduce the physical footprint of a shipping line to increase efficiency and decrease cost.

Another way to increase the efficiency and decrease the cost of a shipping production line is to automate various aspects of the line. However, the cost of automation has been so great that a shipping production line required substantial human participation. It is estimated that it would cost over one million dollars to implement a fully automated shipping processor line, if it could be done at all. Presently, the computer processing of a package to be shipped takes about two seconds and, at best under certain circumstances is no less than 1.25 seconds. It would be desirable to carry out this computerized shipping processing of each package faster.

Thus, a need exists to overcome the problems with the prior art systems, designs, and processes as discussed above.

SUMMARY OF THE INVENTION

The systems, apparatuses, and methods described provide an automated shipping processor line and method for automatically shipping packages that overcome the hereinaforementioned disadvantages of the heretofore-known devices and methods of this general type and that provide such features with an increased efficiency; in other words, time to process each package is decreased and the amount of floor space needed to house the processor line is decreased.

In an exemplary embodiment, the automated shipping processor facilitates the flow of boxes through a shipping line with minimal human interaction. The automated shipping processor integrates a package scale within a movement surface or line of a conveyor belt. Adjacent the scale is a display or display screen that provides the operator, who is standing next to the scale, with information about the package currently on the scale. Also adjacent the scale is a shipping label printer. It is close enough to the scale so that a single human operator can take the printed shipping label and place it on the box with a minimal amount of movement over a shortest distance, and to do so in less than one second, referred to herein as arms-reach. In particular, the printer label can be ejected from the printer at a distance of approximately 0.5 m (approximately 20 inches) or less.

A hand-held and/or mounted scanning device is positioned adjacent the scale at a location sufficient to project the scanning field onto the surface of the scale. With such a projection, a package that is entirely on the scale can be scanned for volume (e.g., height/width/depth). Volume is scanned for a variety of reasons. First, some boxes are standardized and, when standardized boxes are used, the company who will carry out the shipment (i.e., the shipper) can be pre-determined and, for some standardized boxes, the shipping cost can be fixed. Accordingly, both the shipper and cost can be determined without even weighing the box. Further, with standardized boxes, a particular product(s) placed therein can also be unique. In such a situation, when a standardized size is scanned, if that corresponds to a particular product, the size and weight of that package can be determined even before the scale sends a weight signal to be processed. Removal of the requirement to weigh a particular package saves substantial time in package processing.

A central processing unit, e.g., a personal computer, is connected to the scale, to the display, to the printer, and to the scanner. Each of these units can be separate or some can be integrated together. For example, the display can be a tablet that is connected to the Internet. In this exemplary configuration, therefore, the central processing unit and the display are integral. Further, the shipping determination software is resident within the tablet. Accordingly, the scanner and the scale are the only other separate units, which can be connected to the tablet through conventional connection devices wirelessly (e.g., by Bluetooth) or wired (e.g., by USB or Ethernet).

With this hybrid system having processor-based algorithms and minimal human interaction, the computer processing time is decreased from about two seconds down to about half of a second and the size of the weighing station is reduced to be only as large as the largest footprint of the largest box to be weighed. This results in a cost-effective solution that greatly increases a processor's capacity to ship and reduces shipping department overhead.

The efficiency increased so dramatically that eight shipping lines (which were soon scheduled to increase to sixteen shipping lines) were reduced to only two dedicated lines, and the average time to ship one box reduced from over a minute to an average of two seconds per box.

With the foregoing and other objects in view, there is provided, an automated package processing system comprising a conveyor defining a movement surface and configured to convey packages along the movement surface, each of the packages having package information and a respective package identifier, a package scale having a weighing surface, disposed within the movement surface of the conveyor, and configured to determine a weight of a package as it moves along the movement surface and output package weight information, a display communicatively coupled with the package scale and configured to display at least one of the package identifier and some of the package information about the package currently on the package scale, a shipping database containing shipping information comprising package recipients and package shippers, a shipping label printer located within arms-reach of the package scale and communicatively coupled with at least one of the display and the package scale and configured to print out at least one label to be attached to the package, the at least one label containing at least some of the shipping information indicating a package recipient and a package shipper, at least one scanning device adjacent the package scale and configured to project a scanning field onto the weighing surface and output package measurement information indicating at least one volume characteristic of the package, and a central processor communicatively connected to the package scale, to the display, to the shipping database, to the shipping label printer, and to the at least one scanning device, the central processor being programmed to determine automatically the package shipper and a total shipping cost based upon at least one of the package information and the shipping information independent of the weight of the package.

In accordance with another feature, the shipping label printer is no more than approximately 0.5 m from the package scale.

In accordance with a further feature, the at least one scanning device is hand-held.

In accordance with an added feature, the at least one scanning device is mounted adjacent the display.

In accordance with an additional feature, the at least one scanning device is mounted to the display.

In accordance with yet another feature, the at least one scanning device is integral with the display.

In accordance with yet a further feature, the at least one scanning device is configured to scan a volume of the package on the weighing surface based on height, width, and depth of the package.

In accordance with yet an added feature, the at least one scanning device is at least two scanning devices adjacent the package scale.

In accordance with yet an additional feature, the package scale has a surface area only as large as a largest footprint of a largest package to be weighed.

In accordance with again another feature, the display comprises the central processor and is at least one of a personal computer, a tablet, and a smartphone communicatively connected to at least one of the Internet, the package scale, the shipping database, the shipping label printer, and the at least one scanning device.

In accordance with again a further feature, the package identifier is a unique code placed on the package before arriving at the package scale and the at least one scanning device is configured to scan the unique code.

In accordance with again an added feature, the central processor is programmed to automatically select the shipper based upon the at least one volume characteristic of the package without weighing the package.

In accordance with a concomitant feature, the central processor is programmed to automatically fix the total shipping cost based upon the at least one volume characteristic of the package without weighing the package.

Although the systems, apparatuses, and methods are illustrated and described herein as embodied in a an automated shipping processor line and method for automatically shipping packages, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which:

FIG. 1 is a fragmentary, diagrammatic, side elevational view of an exemplary embodiment of a shipping platform of a shipping processing system with a package in a scanning area on a conveyor scale and with a shipping label printed and ready for attachment to the package;

FIG. 2 is a fragmentary, diagrammatic, top plan view of the system of FIG. 1;

FIG. 3 is a diagrammatic, top plan view of the package and the scanning field of the system of FIG. 1;

FIG. 4 is a diagrammatic, side elevational plan view of the package and the scanning field of the system of FIG. 1;

DETAILED DESCRIPTION OF THE EMBODIMENTS

Figure 5:
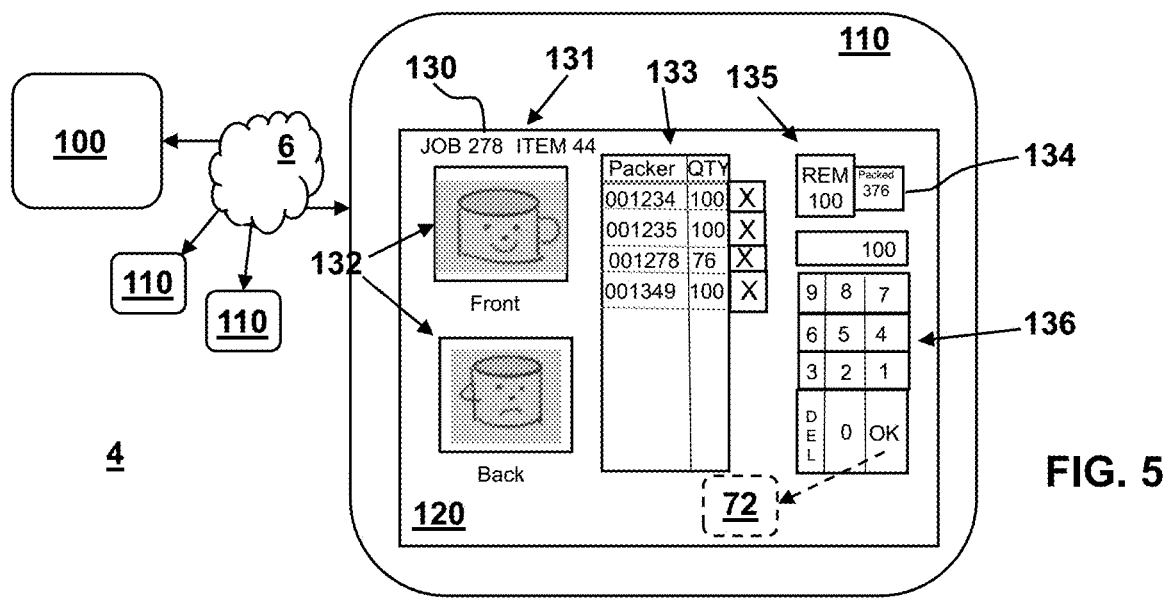
FIG. 5 is a block diagram of an exemplary embodiment of a processing platform of the shipping processing system.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

It will be appreciated that embodiments of the systems, apparatuses, and methods described herein may be comprised of one or more conventional processors and unique stored program instructions that control the one or more processors to implement, in conjunction with certain non-processor circuits and other elements, some, most, or all of the functions of the devices and methods described herein.

The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system or programmable device. A "program," "software," "application," "computer program," or "software application" may include a subroutine, a function, a procedure, an object method, an object implementation, an executable application, an applet, a servlet, a source code, an object code, any computer language logic, a shared library/dynamic load library and/or other sequence of instructions designed for execution on a computer system.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIGS. 1 and 2, there is shown a first exemplary embodiment of an automated package processing system 1 for shipping packages 2. The automated package processing system comprises a shipping platform 3 (see, e.g., FIG. 1) and a processing platform 4 (see, e.g., FIG. 5). The shipping platform 3 comprises a conveyor 10 having an upper conveying or movement surface 12. A package scale 20 is integrated within the conveyor 10, most efficiently, in a way that an upper scale weighing surface 22 is coplanar with the upper conveying surface 12 such that the package 2, when moved from upstream of the scale 20 (the left in FIG. 1), to the scale 20, and then downstream of the scale 20 (the right in FIG. 1), moves smoothly and quickly with only a small amount of propelling force needed for the package 2 to traverse the conveyor 10 and the scale 20. In such a configuration, therefore, the conveyor 10 has an upstream portion 14 starting from an upstream side of the scale 20 and a downstream portion 16 starting from a downstream side of the scale 20.

The conveyor 10 can be in the form of a belt or set of successive belts or as a set of successive rollers, for example. In any configuration of the conveyor 10, a package 2 is moved easily upon the conveying surface 12 from a proximal or upstream end of the conveyor 10 to the distal or downstream end of the conveyor 10. The ends mentioned here are not necessarily the physical ends of the conveyor 10 but, rather, are the locations on the conveying surface 12 at which the package 2 is to be loaded onto the conveyor 10 (the upstream end) and at which the package 2 is to be offloaded from the conveyor 10 (the downstream end). Thus, when "end" is used herein, it can mean any point along the conveying surface 12 of the conveyor 10 and is not limited to the physical start or termination of the conveyor 10. In this regard, when the phrases upstream end or proximal end are used, these refer to a location on the conveying surface 12 anywhere on the upstream portion 14, and when the phrases downstream end or distal end are used, they are referring to a location on the conveying surface 12 anywhere on the downstream portion 16.

The conveying surface 12 is positioned at a height at which the operator 5 can comfortably move the package 2 thereon from the upstream portion 14, across the scale 20, and to the downstream portion 16 while sitting or standing comfortably and without bending over. In an exemplary embodiment, the head of the operator 5 is above the package 2 while the package 2 is present on the scale 20. For example, the conveying surface 12 is between approximately 20 inches and approximately 42 inches from ground.

Adjacent the scale 20 is a display 30 that provides an operator 5 standing next to the scale 20 with information about the package 2 on the scale 20. In an exemplary embodiment, the display 30 is above the scale 20. The display 30 is positioned at a height at which the operator 5 can view information on the display 30 while the package 2 is present on the scale 20. For example, the vertical center of the display 30 is between approximately 20 inches and approximately 42 inches from ground. In an exemplary embodiment, the horizontal center of the display 30 is collinear with a centerline 24 of the scale 20, halfway between the upstream edge of the scale 20 and the downstream edge of the scale 20.

Adjacent the scale 20 and the display 30 is a shipping label printer 40. The printer 40 is close enough to the scale 20 so that a single human operator 5 can take a printed shipping label 42 just printed by the printer 40 and place it on the package 2 with a minimal amount of movement over a shortest distance D, and to do so in less than one second. In an exemplary embodiment, the just-printed label 42 can be ejected from the printer 40 at a distance D of approximately 0.5 m (approximately 20 inches) or less.

One or more hand-held or mounted scanners 50 is/are positioned adjacent the scale 20 and the display 30. Each scanner 50 has a projected scanning field 52 in which the package 2 can be scanned. Accordingly, the scanner 50 is placed at a location to project the scanning field 52 at least onto the upper scale surface 22. With such a projection, a package 2 having a bottom area entirely within the upper surface boundaries of the scale 20 is scanned for various characteristics. One characteristic is volume (e.g., any one or more of height, width, and depth). Volume is scanned for a variety of reasons. First, some boxes have standardized sizes. As such, when standardized boxes are used, a particular shipping entity (referred to herein as the "shipper") can be pre-determined to be the shipper for that standardized box and, for some of the standardized boxes, a shipping cost for that box can be a fixed amount. Accordingly, both the shipper and the total shipping cost can be determined automatically, in a matter of microseconds, without even weighing the box. This is a significant and important feature. This means that the mere act of sliding the package 2 onto the upper surface 22 of the scale 20 automatically defines who will ship that package 2 and how much that package 2 will cost—two acts that, previously, were required to be done by a human operator 5 and, in doing so, took significant time. This costly time delay is completely eliminated with the system 1.

Further, the availability of standardized boxes allows a user of the system to associate a single, particular product with a given box; in other words, when that given box is used, the user defines the contents of the given box as only including product A in a specified amount (e.g., 10 units of product A). Because the particular product A has a known weight, the weight of a package 2 comprising the particular product A and the given box can be known before the package 2 is ever placed onto the conveyor 10. In such a situation, when that given box is scanned—even if the given box is not entirely on the scale 20, the size and weight of that package 2 is determined instantly (measured in microseconds) and well before the scale 20 even sends a weight signal to be processed. It is self-evident that removal of a requirement to weigh a particular package 2 saves substantial time in package processing.

A central processor 60 is connected to the scale 20, to the display 30, to the printer 40, and to the scanner 50. Exemplary embodiments of the processor 60 include, but are not limited to, a personal computer (desktop or laptop), a tablet, and a smartphone. The processor 60 carries out at least one program (e.g., apps, software) that collects, stores, and uses information regarding weight, shipper identification, standardized boxes, shipper-specific labeling requirements, and other data associated with a shipping database 70; the shipping database 70 can be stored with the processor 60 or they can be accessed by the processor 60 through the Internet 6.

Each of these units can be separate or some can be integrated together. For example, the display 30 can be a tablet connected to the Internet. In the exemplary configuration of FIGS. 1 and 2, therefore, the central processor 60 and the display 30 are integral.

Simplifying the system even further, the shipping determination software and database 70 are resident within the tablet. Accordingly, the scanner 50 and the scale 20 are the only other separate units, which can be connected to the tablet (as the processor 60) through conventional connection devices wirelessly (e.g., by Bluetooth) or wired (e.g., by USB or Ethernet). Also, depending on the sophistication of the display 30 (which can be a tablet, a desktop, or a laptop), the scanner 50 can be integrated into the body of the display 30 as well, as in a camera on a smartphone.

The system is configured to be used with many available scanners, scales, printers, and displays. This allows different hardware to be used whenever necessary while still functioning with the software system provided herein. One exemplary configuration for the hardware system 1 is a Microsoft tablet running Microsoft Windows, and another example is an Apple iPad running iOS.

In an exemplary embodiment, all packages 2 arrive at the conveyor 10 completely sealed and ready to be shipped (that is, once a shipping label 42 is attached). Therefore, there is no way to know what is in the box without destroying the sealing tape. Accordingly, unique codes 72 (such as barcodes or QR codes) identify aspects of the package 2 and are placed thereon at the processing platform 4 before arriving at the shipping platform 3. To handle packages 2 having the code 72 placed on any of the surfaces, the scanner or scanners 50 are placed at the scale and is/are aimed at the package 2 to read codes 72 on top of the package 2 and/or on its sides. In an embodiment with a single scanner, the scanner can be placed at a corner of the scale and aimed to read a code on either the sides of the package 2 or on the top (as shown in FIG. 2). Alternatively, two scanners 50 can be placed at the scale 20 in different locations (also shown in FIG. 2). In an exemplary configuration, one scanner 50 can be placed substantially above the package 2 to read codes 72 on the top of the package 2 (e.g., as shown in FIGS. 3 and 4) or be placed on one side facing the display 30 (not illustrated) and the other scanner 50 can be placed at an angle to the scale 20 to read codes 72 on sides of the package 2 or on the top surface of the package or the other scanner 50 can placed at a side of the scale 20 to read codes on any side of the package 2. With only two scanners 50 in the various positions (e.g., upper, corner, side), the user can easily slide the package 2 on to the scale 20 without having to worry about the package 2 not being read and achieve a high level of scanning success when the package 2 is placed anywhere within the scanning field 52. In another exemplary embodiment, the upper scale surface 22 can be transparent and a scanner 50 can be placed below the scale 20 and read the code 72 through the scale 20 from below the scale 20. In any configuration, the system 1 can be successful with one or, at most, two scanners 50. Prior art systems are more elaborate and require an expensive system of mirrors and many scanners to achieve the level of code-reading success of the system 1.

In an exemplary method for processing packages, each package 2 is identified with a unique code before being placed on the upstream portion 14 of the conveyor 10. The system 1 contains a processing platform 4 that comprises a central processing unit 100 (e.g., a server) connected to user terminals 110 (e.g., one user terminal 110 for each packer) either wired or wirelessly and/or through the interne 6. Software resides on the central processing unit 100 and the user terminals 110 to exchange information with the packer (s) and, from this information, to generate the unique identifier for each package 2. This process begins when a packer packs items into the package 2. Stored in the central processing unit 100 are product orders that have been completed and the products are ready to be shipped by the system 1. The packer physically receives an order of items to be packed within the package 2 at a respective packing station, where the user terminal 110 is located. Along with the physical order of items is the unique identifier, such as an order or job number, indicating various pieces of information including, but not limited to, what the order comprises and to where it is to be shipped. The identifier can be a slip of paper with the job number printed thereon for the packer to enter into the user terminal 110 or it can be a code (such as a barcode or QR code) that is read by a scanner located at the user terminal 110 and, when scanned, the job number automatically loads into the user terminal 110 with the relevant information about that job number from the central processing unit 100. To exchange this information between the packer and the system 1, the software on the user terminal 110 provides a user interface 130 on, for example, a touch-screen display 120 of the user terminal 110. Exemplary user interfaces 130 are shown in FIGS. 5 and 6.

Figure 6:
FIG. 6 is a graphic of an exemplary embodiment of a user interface of the processing platform of FIG. 5.
Figure 7:
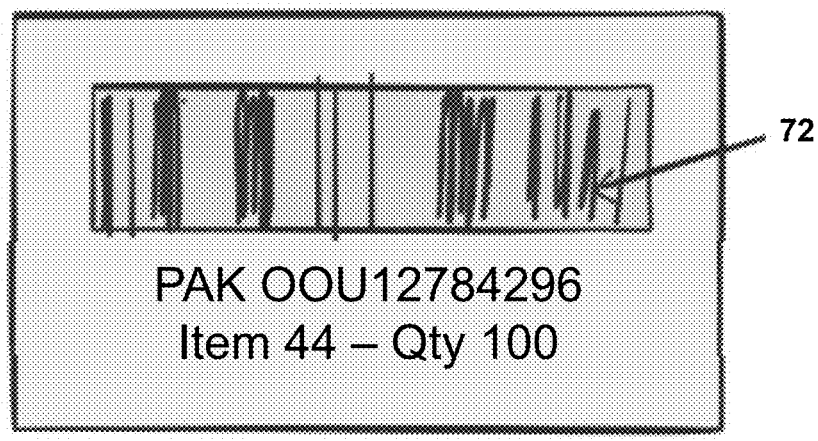
FIG. 7 is a diagrammatic representation of an internal processing code generated by the processing platform of FIG. 5.

In the example of FIG. 5, the user interface 130 includes a job location 131 at which the job number appears. In this example, the job number is 278. For this job number, there is also an item number "44", which corresponds to a happy-face mug, for example. The user interface 130 has a pictorial location 132, at which appear graphics or pictures previewing item number 44. Therefore, if the pictures do not match the item currently in before the packer, then the packer knows that an error has occurred. With the pictures matching the item before the packer, the packer starts packing the items into the package 2. For the example of job number 278, the order is large and requires a multiple of packages 2 to ship the entire order. Accordingly, the user interface 130 provides a packed boxes location 133 at which is displayed information including the identity of the packer (e.g., a six-digit number) and the amount of item number 44 that has been packed in each package 2 packed by the corresponding packer. In this exemplary embodiment, packer 001234 already packed one package 2 with 100 units of item number 44, packer 001235 already packed one package 2 with 100 units of item number 44, packer 001278 already packed one package 2 with 76 units of item number 44, and packer 001349 already packed one package 2 with 100 units of item number 44. Therefore, four packages 2 have already been packed for job number 278 for a total count of 376 packed units of item number 44. This total count is provided in a total count location 134 on the user interface 130. In an example where the total number of units to be shipped is 476, a remaining count location 135 on the user interface 130 indicates to the packer that 100 units remain to be packed. The packer begins to pack a fifth package 2 and, in this example, is able to pack 100 units of item number 44 in that package 2. The user interface 130 provides a number entry panel 136 at which the packer indicates how many units were placed in the package 2 being packed. When 100 units are packed into the package 2, the packer types in the packed count of "100" into the number entry panel 136 and hits "OK" or "PACK" to indicate to the central processing unit 100 that the entered number of units of item number 44 for job number 278 were physically packed in the package 2 presently before the packer. With that entry, the total count location 134 is updated by the central processing unit 100 to display 476 and the remaining count location 135 is updated to display a "0" to indicate that job number 278 is complete and, therefore, will not allow another packer to pack or ship out any more items for job number 278. Immediately upon completing this package 2 of the last 100 units, a unique code 72 is generated for this package and that code 72 is printed out at a printer located at or in the user terminal 110 (see, e.g., FIG. 7), preferably in the form of a sticker. The packer then places the code 72 on an outer surface of the package 2. Only one code 72 can be placed on the surface, or more than one code 72 can be placed thereon (for example, one on top and one on a side of the package 2).

When generated, the code 72 is associated with information that can be used, for example, to indicate the type of contents inside the box, how many pieces are in the box, to where the box needs to be shipped, and when the box needs to arrive. Also associated with the code 72 is information that includes the type of box used (e.g., is it a standard sized box), the weight of the contents, and/or the total weight of the box including the contents, for example. From the code 72, the system 1 can derive any specific information about the order including, for example, the destination address, attributes about the customer, and shipping costs for the order. Importantly, the system 1 knows the weight of item number 44 and how many items are in the package 2. The system 1 also knows the size of the box and whether it is a standard size that can be shipped at a flat rate regardless of the weight or if a flat rate can be applied if the total package weight is below a certain amount. Accordingly, with such information, the system 1 accesses the different and various shipper cost databases (e.g., USPS, UPS, DHL, FedEx, independent ground and/or air carriers through the Internet) and determines various cost estimates for shipping that has the package 2 arrive at the destination on or before the arrival due date. One way to select the cost is to determine the lowest cost. Another way to select the cost is to determine the lowest cost that achieves the fastest delivery. As set forth above, this calculation is done automatically, e.g., by the central processing unit 100, when the code 72 is generated and is stored in the memory or database 70 of the central processing unit 100 (and/or in the user terminal 110).

Figure 8:
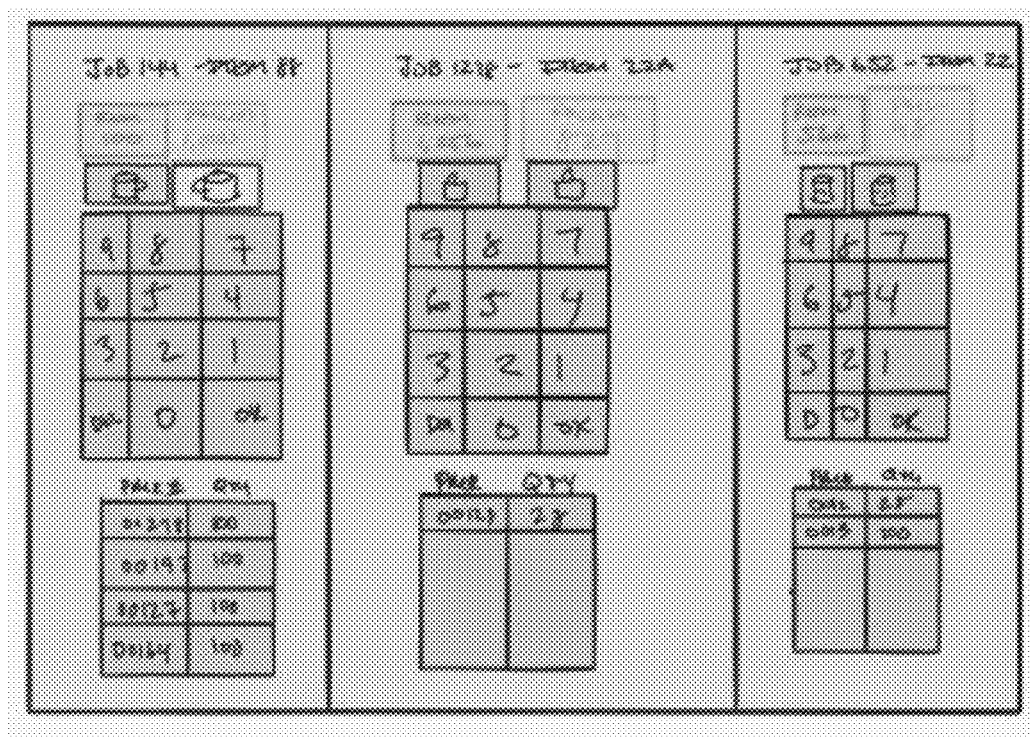
FIG. 8 is a graphic of another exemplary embodiment of a multi-order user interface of the processing platform of FIG. 5.
Figure 9:
FIG. 9 is a graphic of a further exemplary embodiment of a multi-order user interface of the processing platform of FIG. 5.

FIG. 8 illustrates an alternative display for the packer where three different jobs are shown and queued for packing and FIG. 9 illustrates an alternative display for the packer where two different jobs are shown and queued for packing.

With the package 2 having the code 72 placed thereon, the package 2 is now moved from the processing platform 4 to the shipping platform 3 of the system 1. The user of the shipping platform 3 moves the package 2 from the upstream portion 14 onto the upper scale surface 22 and automatic scanning occurs to read at least one of the codes 72 on the package 2. As the code scanner 50 scans the package 2 in the scanning field 52, the system 1 begins to read weight data from the scale 20 at a repeated rate (which rate is configured in an application setting and can be, for example, twenty weight readings per second). The system 1 automatically knows that the user has placed a package 2 on the scale 20 and is no longer moving the package 2 when a successful scanning of the code 72 occurs along with a constant weight value from the scale 20, constant being for a program-configured period of time. For example, the weight is read ten times per second and the constant weight value has lasted for 1.5 seconds. The system ignores a package 2 if it was already scanned, for example, if the user has shifted the package around on the scale 20 and caused the system 1 to trigger off another code scan.

Once the package 2 has been identified and the system 1 determines that the package 2 is a valid package to be shipped by the system 1, the software performs a number of actions, either in a given order or in parallel. If weight is a factor to be determined, one action is weight verification. During weight verification, the software takes the current weight value of the package 2 from the scale 20 and compares it to an expected weight for the shipment, which weight was predefined when the box was packaged based on the known weight information, for example, for the box, for the packing material, and for the items within the box. As part of the software database, each item to be packaged and shipped has its own identifier (e.g., a SKU) and each identifier has a corresponding weight. If, for example, a can koozie has a weight of two ounces and the package is shipping one hundred koozies within the package, and the box weights ten ounces and has no packing material, then the total weight of the package 2 should be very close or exactly two-hundred ten ounces. If the package 2 has a weight value that is different from this pre-defined number, then the package 2 can be held for quality control and inspection or it can be shipped out with the new weight value.

A second action that is taken is shipping route selection. In this action, the software looks at the destination address and the time in which the package 2 is required to arrive at the recipient and derives a table of all possible shipping methods from the user to the package recipient. Shipping methods include different carriers such as FedEx, DHL, USPS, and UPS, for example. From this, the software determines the most cost-efficient way to get the package 2 to the recipient at least on time or possibly earlier than the required arrival time.

The software also takes into account, in another action, customer-specific attributes. For example, for specific types of product orders or for particular customers, the user of the system 1 may want to upgrade the shipment being sent. Accordingly, the user pre-defines those upgrades ahead of package creation (of course, the user at the shipping platform 3 can also individually upgrade the package 2 before printing the shipping label 42). Therefore, when shipments to such customers or shipments of the certain products are accepted by scanning in the shipping platform 3, the software may select an expedited form of shipment with a given carrier, while still attempting to minimize cost if desired.

A further action is referred to as flagging orders. Some orders may have billing issues or internal problems. These orders are flagged in the software and, if accidently packaged, are indicated as being those packages that the user should set aside and not ship out. Thus, when a flagged order is packaged and scanned, the display 30 shows an error message to the user (possibly along with some visual feedback, such as a red "do not ship" sign, and/or audio feedback, such as a buzzer or klaxon) and, if desired, causes a specific error label to be printed from the printer 40 to place on the package 2 for further investigation by the user.

When all processing is complete, the software generates the physical label 42 to be attached to the package 2 by the user and the information associated with the label 42 is stored in the database of the system 1. Once the label 42 is generated, all tracking information is stored in the database for customer notifications, quality control, and product accounting to name a few. If a user scans a package 2 that has already been processed, the user is prompted to reprint the same label again.

With past shipping management systems, a user made each decision on shipping manually. This took a lot of time and created many errors because of the rush to process thousands of packages each day. With the system 1, however, almost all aspects related to shipping are automatic. The delivery address, the expected time, and the known weight are all pre-defined and, with these pieces of information, the power of the system 1 to connect to the Internet 6 and price-shop each of the possible shippers and methods allows the selection of the shipper and the shipping method (e.g., ground/two-day/overnight) to be precise and to occur in microseconds with minimal if no error and to ship in the most efficient way possible. Further, by predefining customer specific attributes, the system 1 can treat certain orders with priority (e.g., particular preferred recipient) and can automatically update the shipping to, e.g., from two-day to one-day, whether as a standard-operating procedure for that client or just one time as a courtesy.

Significantly, the system can add to the shipping label customized advertising that was not possible before. For example, the customer's unique logo can be added to the label. In addition, a promotional code can be dynamically generated onto bottom of shipping label in an advertising area (e.g., the lower two inches).

With the system 1, the process of shipping an individual package 2 actually reduces to approximately 2 seconds per package instead of one minute and fifteen seconds per package. This is an increase in throughput by more than a factor of sixty.

With regard to the cost of an automated shipping solution, the same significant factor occurs. Standard automated shipping solution typically cost up to one million dollars to process approximately five hundred packages per day on an eight-hour shipping line. These solutions, at best, took one minute and fifteen seconds to generate a label for each package and each was done manually by a human user. Advertising was not available because any incorrect advertisement could have indicated to the recipient that the package originated from a different supplier than was thought of by the recipient. In contrast, the cost for the system 1 is about five thousand dollars, a reduction in cost by a factor of two hundred. With regard to the speed of the system 1, it is a hybrid that applies both technology and human interaction. The user merely has to physically weigh the package and apply the produced shipping label 42 on the package 2. All information on the label 42 is automatically produced. In about 2 seconds, the carrier is selected, the method of shipment is selected, and any desired advertisement, discount, or message is printed onto the label 42 without delay and without error. The final result is that a user can process well over approximately ten thousand packages per day on an eight-hour shipping line.

With this hybrid system having processor-based algorithms and minimal human interaction, the computer processing time is decreased from about two seconds down to about half of a second and the size of the weighing station is reduced to be only as large as the largest footprint of the largest box to be weighed. This results in a cost-effective solution that greatly increases a processor's capacity to ship and reduces shipping department overhead.

The efficiency increased so dramatically that eight shipping lines (which were soon scheduled to increase to sixteen shipping lines) were reduced to two dedicated lines and the average time to ship one box reduced from over sixty seconds to an average of six seconds per box.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

In this regard, various processing actions are indicated herein as being taken by the central processing unit 100. As the system 1 is distributed, any of the actions taken by the central processing unit 100 can also be taken by the user terminal 110 in a coordinated manner. Accordingly, the system 1 is not limited by examples described herein as having a particular action taken by the central processing unit 100 when the user terminal 110 can also or alternatively take that action. Herein, the terms platform and portion are used. These terms are not to be limited and/or construed as only to their dictionary definitions. Platform can be a physical part but it also can be a subsystem of even larger overall system, which system can be or can include software that is not physical. Likewise, the word portion is not limited to only being a part of a whole structure and, additionally, can be even broader to include ways to subdivide systems or structures, whether tangible or intangible.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. An automated package processing system, comprising:
   a conveyor defining a movement surface and configured to convey packages along the movement surface, each of the packages having package information and a respective package identifier;
   a package scale having a weighing surface, disposed within the movement surface of the conveyor, and configured to:
      determine a weight of a package as it moves along the movement surface; and
      output package weight information;
   a display communicatively coupled with the package scale and configured to display at least one of the package identifier and some of the package information about the package currently on the package scale;
   a shipping database containing shipping information comprising package recipients and package shippers;
   a shipping label printer located within arms-reach of the package scale and communicatively coupled with at least one of the display and the package scale and configured to print out at least one label to be attached to the package, the at least one label containing at least some of the shipping information indicating a package recipient and a package shipper;
   at least one scanning device adjacent the package scale and configured to:
      project a scanning field onto the weighing surface; and
      output package measurement information indicating at least one volume characteristic of the package; and
   a central processor communicatively connected to the package scale, to the display, to the shipping database, to the shipping label printer, and to the at least one scanning device, the central processor being programmed to:
      determine automatically the package shipper and a total shipping cost based upon at least one of the package information and the shipping information independent of the weight of the package; and
      automatically select the shipper based upon the at least one volume characteristic of the package without weighing the package.

2. The system according to claim 1, wherein the shipping label printer is no more than approximately 0.5 m from the package scale.

3. The system according to claim 1, wherein the at least one scanning device is hand-held.

4. The system according to claim 1, wherein the at least one scanning device is one of:
   mounted adjacent the display;
   mounted to the display; and
   integral with the display.

5. The system according to claim 1, wherein the at least one scanning device is configured to scan a volume of the package on the weighing surface based on height, width, and depth of the package.

6. The system according to claim 1, wherein the at least one scanning device is at least two scanning devices adjacent the package scale.

7. The system according to claim 1, wherein the package scale has a surface area only as large as a largest footprint of a largest package to be weighed.

8. The system according to claim 1, wherein the display comprises the central processor and is at least one of a personal computer, a tablet, and a smartphone communicatively connected to at least one of the Internet, the package scale, the shipping database, the shipping label printer, and the at least one scanning device.

9. The system according to claim 1, wherein:
   the package identifier is a unique code placed on the package before arriving at the package scale; and
   the at least one scanning device is configured to scan the unique code.

10. An automated package processing system, comprising:
    a conveyor defining a movement surface and configured to convey packages along the movement surface, each of the packages having package information and a respective package identifier;
    a package scale having a weighing surface, disposed within the movement surface of the conveyor, and configured to:
       determine a weight of a package as it moves along the movement surface; and
       output package weight information;
    a display communicatively coupled with the package scale and configured to display at least one of the package identifier and some of the package information about the package currently on the package scale;
    a shipping database containing shipping information comprising package recipients and package shippers;
    a shipping label printer located within arms-reach of the package scale and communicatively coupled with at least one of the display and the package scale and configured to print out at least one label to be attached to the package, the at least one label containing at least some of the shipping information indicating a package recipient and a package shipper;
    at least one scanning device adjacent the package scale and configured to:
       project a scanning field onto the weighing surface; and
       output package measurement information indicating at least one volume characteristic of the package; and
    a central processor communicatively connected to the package scale, to the display, to the shipping database, to the shipping label printer, and to the at least one scanning device, the central processor being programmed to:
       determine automatically the package shipper and a total shipping cost based upon at least one of the package information and the shipping information independent of the weight of the package; and
       automatically fix the total shipping cost based upon the at least one volume characteristic of the package without weighing the package.

11. The system according to claim 10, wherein the shipping label printer is no more than approximately 0.5 m from the package scale.

12. The system according to claim 10, wherein the at least one scanning device is hand-held.

13. The system according to claim 1, wherein the at least one scanning device is one of:
    mounted adjacent the display;
    mounted to the display; and
    integral with the display.

14. The system according to claim 10, wherein the at least one scanning device is configured to scan a volume of the package on the weighing surface based on height, width, and depth of the package.

15. The system according to claim 10, wherein the at least one scanning device is at least two scanning devices adjacent the package scale.

16. The system according to claim 10, wherein the package scale has a surface area only as large as a largest footprint of a largest package to be weighed.

17. The system according to claim 10, wherein the display comprises the central processor and is at least one of a personal computer, a tablet, and a smartphone communicatively connected to at least one of the Internet, the package scale, the shipping database, the shipping label printer, and the at least one scanning device.

18. The system according to claim 10, wherein:
the package identifier is a unique code placed on the package before arriving at the package scale; and
the at least one scanning device is configured to scan the unique code.

19. An automated package processing system, comprising:
a conveyor defining a movement surface and a scanning surface, the conveyor configured to convey packages along the movement and scanning surfaces, each of the packages having package information, a respective package identifier, and a weight;
a display configured to display at least one of the package identifier and some of the package information about the package currently on the scanning surface;
a shipping database containing shipping information comprising package recipients and package shippers;
a shipping label printer located within arms-reach of the scanning surface and communicatively coupled with the display and configured to print out at least one label to be attached to the package, the at least one label containing at least some of the shipping information indicating a package recipient and a package shipper;
at least one scanning device adjacent the scanning surface and configured to:
project a scanning field onto the scanning surface; and
output package measurement information indicating at least one volume characteristic of the package; and
a central processor communicatively connected to the display, to the shipping database, to the shipping label printer, and to the at least one scanning device, the central processor being programmed to:
determine automatically the package shipper and a total shipping cost based upon at least one of the package information and the shipping information independent of the weight of the package; and
automatically select the shipper based upon the at least one volume characteristic of the package without weighing the package.

\* \* \* \* \*